US011987013B2

(12) United States Patent
Takayanagi et al.

(10) Patent No.: US 11,987,013 B2
(45) Date of Patent: May 21, 2024

(54) COMPOSITE MATERIAL FORMING METHOD

(71) Applicants: MITSUBISHI HEAVY INDUSTRIES, LTD., Tokyo (JP); AKITA UNIVERSITY, Akita (JP)

(72) Inventors: Toshiyuki Takayanagi, Tokyo (JP); Naomoto Ishikawa, Tokyo (JP); Wataru Nishimura, Tokyo (JP); Nobuyuki Kamihara, Tokyo (JP); Sota Kamo, Tokyo (JP); Kiyoka Takagi, Tokyo (JP); Takashi Ishida, Aichi (JP); Tomoharu Dengo, Aichi (JP); Mikio Muraoka, Akita (JP); Yukihiro Yoshida, Akita (JP)

(73) Assignees: MITSUBISHI HEAVY INDUSTRIES, LTD., Tokyo (JP); AKITA UNIVERSITY, Akita (JP)

(*) Notice: Subject to any disclaimer, the term of this patent is extended or adjusted under 35 U.S.C. 154(b) by 409 days.

(21) Appl. No.: 17/419,793

(22) PCT Filed: Jan. 16, 2020

(86) PCT No.: PCT/JP2020/001292
§ 371 (c)(1),
(2) Date: Jun. 30, 2021

(87) PCT Pub. No.: WO2020/158416
PCT Pub. Date: Aug. 6, 2020

(65) Prior Publication Data
US 2022/0080682 A1 Mar. 17, 2022

(30) Foreign Application Priority Data
Jan. 29, 2019 (JP) ................... 2019-013582

(51) Int. Cl.
*B29C 35/08* (2006.01)
*B29C 70/20* (2006.01)
*B29C 70/54* (2006.01)

(52) U.S. Cl.
CPC .......... *B29C 70/54* (2013.01); *B29C 35/0805* (2013.01); *B29C 70/20* (2013.01);
(Continued)

(58) Field of Classification Search
CPC ......... B29C 35/0805; B29C 2035/0811; B29C 2035/0816; B29C 70/20
(Continued)

(56) References Cited

U.S. PATENT DOCUMENTS 2,372,929 A    4/1945  Blessing
4,243,460 A *  1/1981  Nagler .................. G21F 1/12
                                                  264/487 X
(Continued)

FOREIGN PATENT DOCUMENTS

EP    2821200 A1    1/2015
JP    S5942928 A    3/1984
(Continued)

OTHER PUBLICATIONS

Extended European Search Report for European Application No. 20749433.7 dated Dec. 23, 2021; 7pp.
(Continued)

*Primary Examiner* — Leo B Tentoni
(74) *Attorney, Agent, or Firm* — HAUPTMAN HAM, LLP

(57) ABSTRACT

A method for forming a composite material including reinforcing fibers includes connecting end portions of the reinforcing fibers with equipotential materials to form an electroconductive loop including the reinforcing fibers in the composite material before reaction; and applying a magnetic
(Continued)

field in a direction intersecting a plane formed by the electroconductive loop.

10 Claims, 4 Drawing Sheets

(52) U.S. Cl.
CPC ............... *B29C 2035/0811* (2013.01); *B29C 2035/0816* (2013.01)

(58) Field of Classification Search
USPC ........................................ 264/405, 486, 487
See application file for complete search history.

(56) References Cited

U.S. PATENT DOCUMENTS

| 5,357,085 | A | 10/1994 | Sturman, Jr. |
| 10,096,396 | B2 | 10/2018 | Humfeld |
| 10,497,488 | B2 | 12/2019 | Humfeld |
| 2003/0062118 | A1 | 4/2003 | Gerhard et al. |
| 2016/0055930 | A1 | 2/2016 | Humfeld |
| 2019/0019596 | A1 | 1/2019 | Humfeld |
| 2019/0118488 | A1 | 4/2019 | Kamihara et al. |

FOREIGN PATENT DOCUMENTS

| JP | 02155622 A | * | 6/1990 | ............. B29C 43/52 |
| JP | 2014116293 A | | 6/2014 | |
| JP | 2016044302 A | | 4/2016 | |
| WO | 2017183467 A1 | | 10/2017 | |

OTHER PUBLICATIONS

Office Action for Japanese Application No. 2019-013582 dated Aug. 23, 2022; 6pp.

* cited by examiner

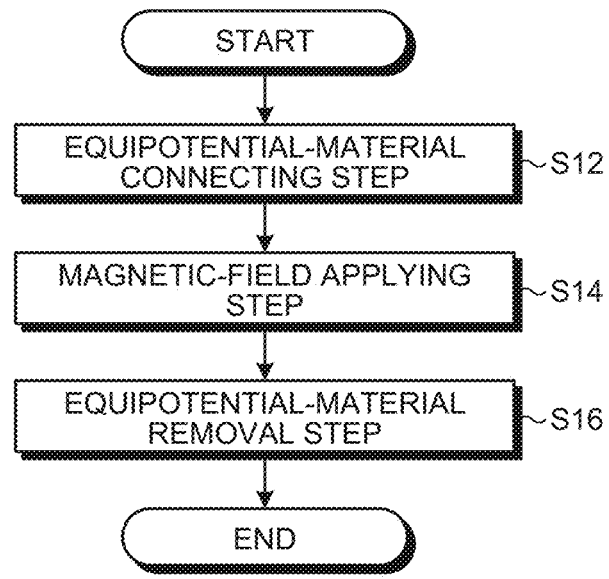
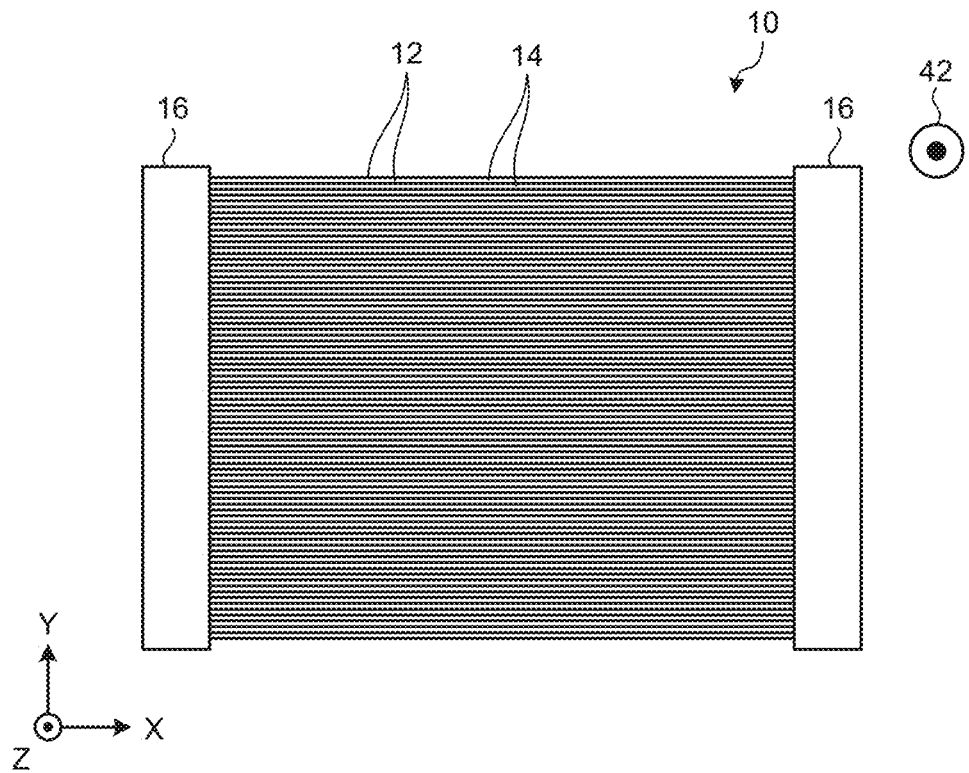

COMPOSITE MATERIAL FORMING METHOD

RELATED APPLICATIONS

The present application is a National Phase of International Application Number PCT/JP2020/001292 filed Jan. 16, 2020 and claims priority to Japanese Application Number 2019-013582 filed Jan. 29, 2019.

FIELD

The present invention relates to a composite material forming method.

BACKGROUND

As a material having lightweight properties and high strength, a composite material formed by impregnating reinforcing fibers with resin is known. The composite material is used for airplanes, automobiles, and ships, for example. As a method for producing the composite material, a method is known in which sheets of a composite material formed by impregnating reinforcing fibers with resin are stacked on one another, and while the stacked sheets are being pressed, magnetic metal plates are placed near magnetic field coils configured to generate a magnetic field and then the composite material is subjected to induction heating using the magnetic field (see Patent Literature 1).

CITATION LIST

Patent Literature

Patent Literature 1: Japanese Patent Application Laid-open No. 2014-116293

SUMMARY

Technical Problem

A composite material has electroconductivity in a portion of reinforcing fibers thereof. Thus, the electric conductivity of the composite material is low except in a certain direction. Thus, when a composite material is subjected to induction heating in a magnetic field by using a method of Patent Literature 1, there is a problem in which because the electric conductivity of the composite material is low except in a certain direction, even when the magnetic field is applied to the entire composite material, an area that has not been sufficiently heated without a sufficient eddy current being induced inside the composite material remains depending on the area of the composite material, thereby causing temperature unevenness in the composite material during heating. Given these circumstances, there is a problem in which a composite material obtained by subjecting the composite material to induction heating in a magnetic field thereby causing resin thereof to react by using the method of Patent Literature 1 produces strength unevenness and thus does not achieve high quality.

The present invention has been made in view of the above, and an object thereof is to provide a composite material forming method that reduces the occurrence of temperature unevenness in a composite material during heating.

Solution to Problem

To solve the problems described above and achieve the object, a composite material forming method is a method for forming a composite material including reinforcing fibers. The method includes an equipotential-material connecting step of connecting end portions of the reinforcing fibers with equipotential materials to form an electroconductive loop including the reinforcing fibers in the composite material before reaction; and a magnetic-field applying step of applying a magnetic field in a direction intersecting a plane formed by the electroconductive loop.

With this configuration, because the electroconductive loop is formed by the reinforcing fibers and the equipotential materials arranged on the end portions of the composite material, a sufficient eddy current can be induced in an area of the composite material between the equipotential materials, that is, across the entire composite material when the magnetic field is applied, whereby the occurrence of temperature unevenness in the composite material can be reduced. Thus, with this configuration, the occurrence of strength unevenness in the composite material obtained by causing the resin to react can be reduced, whereby the composite material with high quality can be obtained.

In this configuration, it is preferable that the equipotential-material connecting step includes, by the equipotential materials, connecting end portions of two of the reinforcing fibers on one end side to each other and connecting end portions of the two reinforcing fibers on another end side to each other. With this configuration, the electroconductive loop including the two reinforcing fibers is formed, and thus a sufficient eddy current can be induced in an area between the two reinforcing fibers. Thus, a sufficient eddy current can be induced in any area of the composite material in which the reinforcing fibers are arranged, whereby the occurrence of temperature unevenness in the composite material during heating can be further reduced.

Alternatively, in this configuration, it is preferable that the equipotential-material connecting step includes, by the equipotential materials, connecting an end portion of one of the reinforcing fibers on one end side and an end portion of the one of the reinforcing fibers on another end side. With this configuration, the electroconductive loop including only this one reinforcing fiber is formed, and thus an area between two predetermined reinforcing fibers can be arranged inside an area in which a sufficient eddy current is induced. Herein, in the area inside the area in which a sufficient eddy current is induced, the heating efficiency is satisfactory. Thus, any area in the composite material in which the reinforcing fibers are arranged can be an area in which heating is satisfactory, and thus the occurrence of temperature unevenness in the composite material during heating can be further reduced.

In these configurations, it is preferable that at the equipotential-material connecting step, a contact resistance formed between each equipotential material and a corresponding reinforcing fiber is 100Ω or lower. With this configuration, a current can easily flow in the electroconductive loop including the reinforcing fibers. Thus, the heating efficiency can be improved by causing the electroconductive loop including more reinforcing fibers to contribute to heating of the composite material.

In these configurations, it is preferable that an equipotential-material removal step of removing the equipotential materials is further included after the magnetic-field applying step. With this configuration, the composite material in which the occurrence of strength unevenness is reduced can be used without being influenced by the equipotential materials.

In this configuration, it is preferable that the equipotential-material connecting step includes placing electrically conductive jig materials serving as the equipotential materials on the composite material to form the electroconductive loop, and the equipotential-material removal step includes withdrawing the electrically conductive jig materials as the equipotential materials from the composite material. With these configurations, even areas of the composite material in which the equipotential materials are placed to form the electroconductive loop including the reinforcing fibers can be used with the influence of the equipotential materials being reduced.

Alternatively, in this configuration, it is preferable that each electrically conductive coating material includes at least one of an electrically conductive material paste, an electrically conductive material ink, and an electrically conductive material plating solution. With these configurations, the contact resistance that can be formed when the electroconductive loop including the reinforcing fibers is formed can be reduced to a minimum, and thus the heating efficiency can be improved by causing the electroconductive loop including more reinforcing fibers to contribute to heating of the composite material.

Advantageous Effects of Invention

According to the present invention, the composite material forming method that reduces the occurrence of temperature unevenness in the composite material during heating can be provided.

BRIEF DESCRIPTION OF DRAWINGS

FIG. 1 is a flowchart of a composite material forming method according to a first embodiment of the present invention.

FIG. 2 is a top view illustrating an equipotential-material connecting step of the composite material forming method given in FIG. 1.

DESCRIPTION OF EMBODIMENTS

Figure 3:
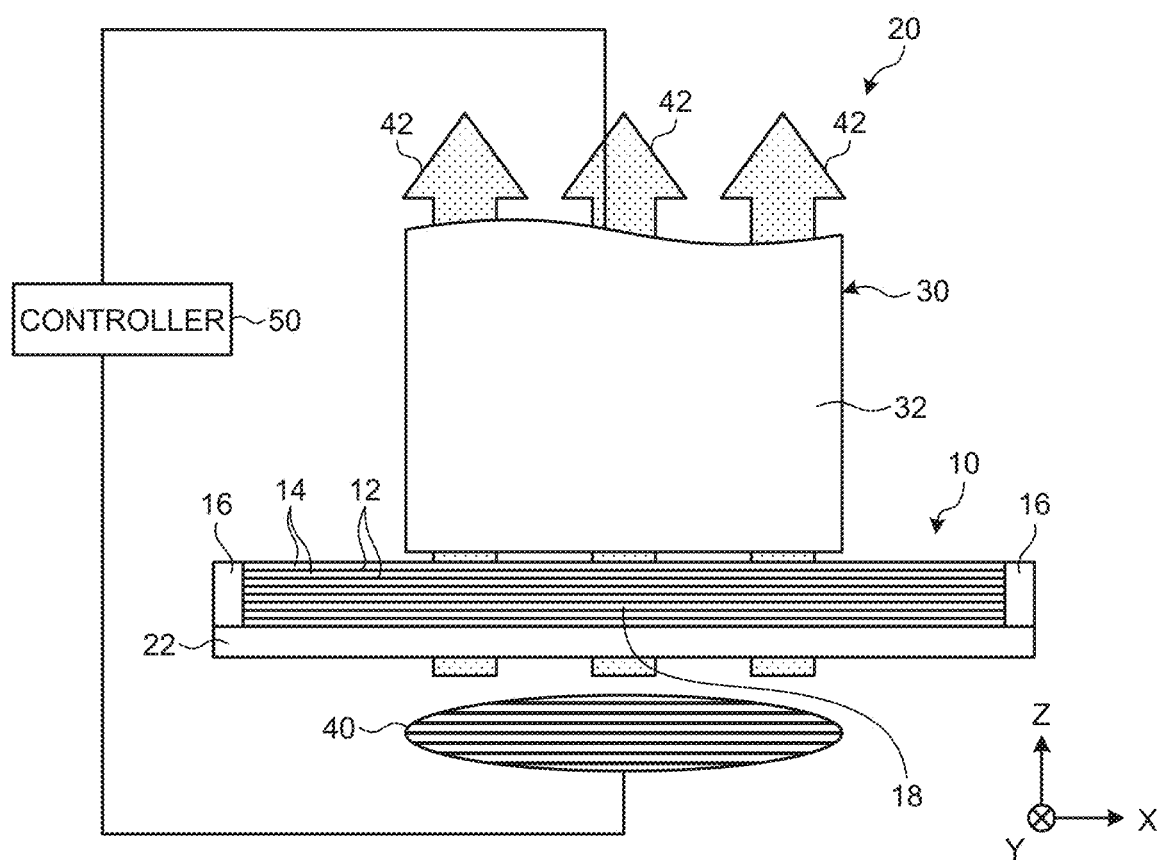
FIG. 3 is a side view illustrating a magnetic-field applying step of the composite material forming method given in FIG. 1.

Embodiments according to the present invention will now be described in detail with reference to the drawings. The present invention is not limited to these embodiments. Components in the embodiments include components that can be replaced and easily conceived by the skilled person or substantially the same components. Furthermore, components described below can be appropriately combined with each other.

First Embodiment

FIG. 1 is a flowchart of a composite material forming method according to a first embodiment of the present invention. As given in FIG. 1, the composite material forming method according to the first embodiment includes an equipotential-material connecting step S12, a magnetic-field applying step S14, and an equipotential-material removal step S16.

FIG. 2 is a top view illustrating the equipotential-material connecting step S12 of the composite material forming method given in FIG. 1. A composite material 10 to be processed by the composite material forming method according to the first embodiment of the present invention includes reinforcing fibers 12 and a resin 14 as illustrated in FIG. 2. As the composite material 10, a material formed in a flat plate shape extending planarly in the X-Y plane direction illustrated in FIG. 1, which is a horizontal direction, is exemplified. In the present invention, the composite material 10 does not necessarily have to be formed in such a flat plate shape, and may be formed in any shape such as a complicated shape having a curve.

In the present embodiment, most of the reinforcing fibers 12 extend inside the composite material 10 along the X-axis direction illustrated in FIG. 2, that is, along one direction in a plane in which the composite material 10 extends, and are arranged along the Y-axis direction illustrated in FIG. 2, that is, along the other direction in the plane in which the composite material 10 extends. Thus, the composite material 10 is what is called a unidirectional material. Herein, the reinforcing fibers 12 do not necessarily have to be arranged in this manner, and some of them may extend along a direction different from the one direction. Hereinafter, the direction (X-axis direction) in which the reinforcing fibers 12 extend in the composite material 10 is referred to as "fiber direction", and the direction (Y-axis direction) in a plane orthogonal to the direction in which the reinforcing fibers 12 extend in the composite material 10 is referred to as "width direction". As the reinforcing fibers 12, carbon fibers are exemplified in the first embodiment. However, the present invention is not limited to this, and the reinforcing fibers 12 may be other fibers having electrical conductivity, such as metallic fibers. The reinforcing fibers 12 may be formed such that some of them are arranged inside the composite material 10 so as to extend along one direction in a plane in which the composite material 10 extends, and some of the remaining reinforcing fibers 12 are arranged so as to extend along the other direction different from the one direction in the plane, and may be formed such that the composite material 10 is a cloth material, for example. In this case, when reinforcing fibers 12 extending along the one direction and the reinforcing fibers 12 extending along the other direction hardly form an electroconductive loop inside the composite material 10, a great effect can be obtained more significantly by the composite material forming method according to the embodiment of the present invention.

The resin 14, with which the reinforcing fibers 12 are impregnated, reacts through the magnetic-field applying step S14 described later included in the composite material forming method according to the first embodiment of the present invention. Examples of the resin 14 include a thermosetting resin that undergoes a thermal curing reaction to change from a softened state or a semi-cured state to a cured state when heated and a thermoplastic resin that undergoes a thermal fusion reaction when heated. Hereinafter, when the thermosetting resin and the thermoplastic resin are not distinguished from each other for the resin 14, the thermal curing reaction of the thermosetting resin and the thermal fusion reaction of the thermoplastic resin are simply referred to as "reaction".

In the first embodiment, when the resin 14 is a thermosetting resin, examples thereof include a resin having an epoxy resin. When the resin 14 has an epoxy resin, the resin is lighter and has higher strength, which is preferred. In the first embodiment, when the resin 14 is a thermosetting resin, other examples thereof include a polyester resin and a vinyl ester resin. In the first embodiment, when the resin 14 is a thermoplastic resin, examples thereof include a polyamide resin, a polypropylene resin, an acrylonitrile butadiene styrene (ABS) resin, a polyether ether ketone (PEEK), a polyether ketone (PEKK), and a polyphenylene sulfide (PPS). However, the resin 14 is not limited to these, and may be another resin.

In the present embodiment, the composite material 10 of the resin 14 before reaction is a prepreg of a composite material, for example. The composite material 10 of the resin 14 after the reaction has lightweight properties and high strength.

As illustrated in FIG. 2, the equipotential-material connecting step S12 is a step of connecting end portions of the reinforcing fibers 12 with equipotential materials 16 to form an electroconductive loop including the reinforcing fibers 12 in the composite material 10 before reaction.

In the present embodiment, at the equipotential-material connecting step S12, as illustrated in FIG. 2, end portions of a plurality of the reinforcing fibers 12 on one end side are connected to each other and end portions thereof on the other end side are connected to each other by equipotential materials 16 placed along the width direction, whereby an electroconductive loop is formed that includes these two reinforcing fibers 12 in which end portions thereof on the one end side are connected to each other and end portions thereof on the other end side are connected to each other and the equipotential materials 16 at two locations. Herein, the end portions of the reinforcing fibers 12 on the one end side mean end portions closer to one of two end portions of each reinforcing fiber 12, and the end portions of the reinforcing fibers 12 on the other end side mean end portions closer to the other of the two end portions of each reinforcing fiber 12. The end portion of each reinforcing fiber 12 on the one end side may be one end of the reinforcing fiber 12, or may be a portion slightly closer to the central side from the one end of the reinforcing fiber 12. The end portion of each reinforcing fiber 12 on the other end side may be the other end of the reinforcing fiber 12, or may be a portion slightly closer to the central side from the other end of the reinforcing fiber 12. In the present embodiment, end portions of the reinforcing fibers 12 on the one end side are connected to each other and the end portions thereof on the other end side are connected to each other by the equipotential materials 16, but the present invention is not limited to this. If end portions of at least two reinforcing fibers 12 on the one end side are connected to each other and end portions thereof on the other end side are connected to each other by the equipotential materials 16, the electroconductive loop including the two reinforcing fibers 12 and the equipotential materials 16 can be formed.

Each equipotential material 16 used at the equipotential-material connecting step S12 is a material that is formed of a material having electrical conductivity, that is, an electrically conductive material, and has a property of substantially equalizing potentials at two connected locations. The electrically conductive material forming the equipotential material 16 used at the equipotential-material connecting step S12 is preferably a metallic material having electrical conductivity, an inorganic material such as ceramic or carbon material having electrical conductivity, or an organic material having electrical conductivity, for example. When the electrically conductive material forming the equipotential material 16 used at the equipotential-material connecting step S12 is a metallic material having electrical conductivity, this metallic material having electrical conductivity is preferably a metallic material having higher electrical conductivity, and as the metallic material having higher electrical conductivity, aluminum, iron, copper, silver, or gold, for example, is preferably used.

The contact resistance formed between each equipotential material 16 used at the equipotential-material connecting step S12 and the corresponding reinforcing fiber 12 is preferably 100Ω or lower, and more preferably 1Ω or higher and 10Ω or lower. In these cases, a current can easily flow in the electroconductive loop including the reinforcing fibers 12 at the magnetic-field applying step S14 described later.

As each equipotential material 16 used at the equipotential-material connecting step S12, at least one of an electrically conductive coating material (e.g., metallic coating material) that forms a coating film of an electrically conductive material (e.g., metallic coating film) when being applied to the composite material 10 and an electrically conductive jig material (e.g., metallic jig material) that can be detachably placed on and withdrawn from the composite material 10 can be preferably used. As the equipotential material 16 used at the equipotential-material connecting step S12, a material into which the electrically conductive coating material and the electrically conductive jig material are appropriately combined can also be preferably used.

When the electrically conductive coating material is used as the equipotential material 16 at the equipotential-material connecting step S12, as the electrically conductive coating material, at least one of an electrically conductive material paste (e.g., metal paste) and an electrically conductive material ink (e.g., metal ink) in which fine particles of an electrically conductive material are dispersed and an electrically conductive material plating solution (e.g., metal plating solution) in which electrically conductive material ions (e.g., metal ions) are dissolved can be preferably used. When the electrically conductive coating material is used as the equipotential material 16 at the equipotential-material connecting step S12, as the electrically conductive coating material, a material in which the electrically conductive material paste, the electrically conductive material ink, and the electrically conductive material plating solution are appropriately combined can also be preferably used.

When the electrically conductive coating material as described above is used as the equipotential material 16 at the equipotential-material connecting step S12, for example, in each of end portions of the reinforcing fibers 12 on the one end side and end portions thereof on the other end side, the electrically conductive coating material is applied to a vertically upper surface of the composite material 10 or a vertically lower surface thereof along the width direction so as to stretch over the reinforcing fibers 12 and is subjected to drying treatment, whereby the equipotential material 16 can be formed in the form of an electrically conductive material film (e.g., metal film). Alternatively, when the electrically conductive coating material as described above is used as the equipotential material 16 at the equipotential-material connecting step S12, the electrically conductive coating material is applied to side surfaces of the reinforcing fibers 12 on the one end side and side surfaces of the reinforcing fibers 12 on the other end side in the composite material 10 along the width direction so as to stretch over the reinforcing fibers 12 and is subjected to drying treatment, whereby the equipotential materials 16 can be formed in the form of electrically conductive material films (e.g., metal films).

When the electrically conductive coating material as described above is used as each equipotential material 16 at the equipotential-material connecting step S12, the equipotential material 16 that is in close and intimate contact with tip portions of the reinforcing fibers 12 exposed in the composite material 10 can be formed, whereby the contact resistance that can be formed when the electroconductive loop including the reinforcing fibers 12 is formed can be reduced. Thus, at the magnetic-field applying step S14 described later, the heating efficiency can be improved by causing the electroconductive loop including more reinforcing fibers 12 to contribute heating of the composite material 10.

When the electrically conductive jig material is used as the equipotential material 16 at the equipotential-material connecting step S12, as the electrically conductive jig material, at least one of electrically conductive material foil (e.g., metal foil) that is thin and can be easily deformed, an electrically conductive material plate (e.g., metal plate) that is slightly thicker than the electrically conductive material foil and has a certain stiffness, an electrically conductive material needle (e.g., metal needle) that is formed so as to extend in a uniaxial direction, and an electrically conductive material comb (e.g., metal comb) in which notches are formed in one of long sides of a plate shape thereof to form a plurality of insertable teeth can be preferably used. When the electrically conductive jig material is used as the equipotential material 16 at the equipotential-material connecting step S12, as the electrically conductive jig material, a material into which the electrically conductive material foil, the electrically conductive material plate, the electrically conductive material needle, and the electrically conductive material comb are appropriately combined can also be preferably used.

When the electrically conductive jig material as described above is used as the equipotential material 16 at the equipotential-material connecting step S12, for example, in each of end portions of the reinforcing fibers 12 on the one end side and end portions thereof on the other end side, processing for placing the electrically conductive jig material is performed on a vertically upper surface of the composite material 10 or a vertically lower surface thereof along the width direction so as to stretch over the reinforcing fibers 12, whereby the equipotential material 16 can be placed. Alternatively, when the electrically conductive jig material as described above is used as the equipotential material 16 at the equipotential-material connecting step S12, the processing for placing the electrically conductive jig material is performed on side surfaces of the reinforcing fibers 12 on the one end side and side surfaces of the reinforcing fibers 12 on the other end side in the composite material 10 along the width direction so as to stretch over the reinforcing fibers 12, whereby the equipotential material 16 can be placed.

When the electrically conductive jig material as described above is used as each equipotential material 16 at the equipotential-material connecting step S12, even after causing the resin 14 to react at the magnetic-field applying step S14 described later, the equipotential material 16 can be removed to be withdrawn at the equipotential-material removal step S16 described later. Thus, even areas of the composite material 10 in which the equipotential materials 16 are placed to form the electroconductive loop including the reinforcing fibers 12 can be used with the influence of the equipotential materials 16 being reduced.

By performing the equipotential-material connecting step S12, the electroconductive loop is formed that includes two reinforcing fibers 12 having electrical conductivity and the equipotential materials 16 at two locations each of which connects end portions of the two reinforcing fibers 12 on the one end side to each other and end portions thereof on the other end side to each other and has electrical conductivity. This electroconductive loop enables an eddy current to be induced by a magnetic field 42 that is applied by a magnetic field coil 40 at the magnetic-field applying step S14 described later, and further enables heat to be generated by electric resistance of the reinforcing fibers 12 themselves due to the induced eddy current in the reinforcing fibers 12 having electric resistance higher than that of the equipotential materials 16. In other words, this electroconductive loop enables heat to be generated inside the composite material 10 in accordance with the magnetic field 42. Heat generated by the reinforcing fibers 12 included in the composite material 10 is transmitted to the resin 14 included in the composite material 10 to contribute to reaction of the resin 14. Consequently, at the equipotential-material connecting step S12, due to the electroconductive loop formed with the reinforcing fibers 12, the equipotential materials 16 can set an area including the inside of the composite material 10 in a state in which a sufficient eddy current is reliably induced when the magnetic field 42 is applied, and thus the occurrence of temperature unevenness in the composite material 10 during heating can be reduced.

FIG. 3 is a side view illustrating the magnetic-field applying step S14 of the composite material forming method given in FIG. 1. Herein, the X-axis direction, the Y-axis direction, and the Z-axis direction in FIG. 3 correspond to the X-axis direction, the Y-axis direction, and the Z-axis direction in FIG. 2, respectively, and the X-axis direction, the Y-axis direction, and the Z-axis direction also in the drawings used for the following description correspond thereto.

A composite material forming apparatus 20 configured to perform the magnetic-field applying step S14 of the composite material forming method according to the first embodiment of the present invention includes a press head 30, a magnetic field coil 40, and a controller 50 as illustrated in FIG. 3. The composite material forming apparatus 20 performs the magnetic-field applying step S14 described later to form into a predetermined size and a predetermined shape a composite material 10 before reaction, in which reinforcing fibers 12 are impregnated with a resin 14 and equipotential materials 16 are placed on the composite material 10, in an area between the equipotential materials 16 at two locations, and simultaneously cause the resin 14 to react.

The composite material forming apparatus 20 according to the first embodiment performs the magnetic-field applying step S14 described later on the composite material 10 arranged on a vertically upper side of a flat stage 22 extending in an X-Y plane direction that is orthogonal to a direction along the Z-axis direction being the vertical direction and is a horizontal direction as illustrated in FIG. 3. In the present embodiment, the direction along the Z-axis direction being the vertical direction in the composite material forming apparatus 20 corresponds to the thickness direction of the composite material 10. Hereinafter, the vertically lower side in the composite material 10 is referred to as "one side", and the vertically upper side in the composite material 10 is referred to as "the other side" as appropriate. In the present embodiment, the magnetic-field applying step S14 is performed on the composite material 10 arranged on the vertically upper side of the flat stage 22. However, the present invention is not limited to this, and the magnetic-field applying step S14 may be performed on the composite material 10 in any arrangement.

In the area between the equipotential materials 16 at two locations, a portion of an area in the composite material 10 that is subjected to pressure treatment and heating treatment by the press head 30 and the magnetic field coil 40 is referred to as "predetermined area 18". In the present embodiment, the predetermined area 18 is part of the area between the equipotential materials 16 at two locations in the composite material 10. However, the present invention is not limited to this, and the predetermined area 18 may be the entire area between the equipotential materials 16 at two locations in the composite material 10, or may be an area including part or the whole of the area between the equipotential materials 16 at two locations in the composite material 10.

The flat stage 22 is formed of a material that is transparent to the magnetic field 42 applied by the magnetic field coil 40, that is, a material in which almost no eddy current is induced by the magnetic field 42 applied by the magnetic field coil 40 and in which almost no heat is generated by the magnetic field 42 applied by the magnetic field coil 40. In the first embodiment, the material that forms the flat stage 22 is preferably a PEEK resin or ceramic, both of which are materials that are transparent to the magnetic field 42 and have high pressure resistance and heat resistance.

As illustrated in FIG. 3, the press head 30 is provided so as to be opposed to the other side of the predetermined area 18 of the composite material 10, and is provided so as to be vertically opposed to the magnetic field coil 40 with the composite material 10 and the flat stage 22 interposed therebetween. The press head 30 presses the predetermined area 18 of the composite material 10 from the other side of the composite material 10.

The press head 30 includes a press head body 32 as illustrated in FIG. 2. The press head body 32 is formed of a material that is transparent to the magnetic field 42 applied by the magnetic field coil 40. The material that forms the press head body 32 is preferably a PEEK resin or ceramic, which is a material that is transparent to the magnetic field 42 and has high pressure resistance and high heat resistance.

On the vertically upper side of the press head body 32, a pressure cylinder (not illustrated) is provided, and this pressure cylinder is electrically connected to the controller 50. With the pressure cylinder of the press head body 32 being controlled by the controller 50, the press head 30 can move up and down in the vertical direction relative to the composite material 10, and can change pressure to be applied to the composite material 10 vertically downward. The press head 30 preferably presses the predetermined area 18 of the composite material 10 at 200 kPa or higher or 800 kPa or lower, and more preferably presses it at 300 kPa or higher or 600 kPa or lower.

As illustrated in FIG. 3, the magnetic field coil 40 is provided so as to be opposed to the one side of the predetermined area 18 of the composite material 10, and is provided so as to be vertically opposed to the press head 30 with the flat stage 22 and the composite material 10 interposed therebetween. The magnetic field coil 40 applies the magnetic field 42 to the predetermined area 18 of the composite material 10 from the one side of the composite material 10.

In the first embodiment, the magnetic field coil 40 having a configuration in which one coil is arranged is exemplified. However, a configuration in which a plurality of coils are arranged in a predetermined shape, for example, in a square shape may be used instead. The magnetic field coil 40 applies the magnetic field 42 to an area that is equivalent to the horizontal area in which the coil is arranged. In the first embodiment, the area to which the magnetic field coil 40 applies the magnetic field 42 preferably corresponds to the predetermined area 18 of the composite material 10.

The coil included in the magnetic field coil 40 is oriented in such a direction that the central axis of the coil intersects a plane in which the composite material 10 extends. The magnetic field coil 40 generates the magnetic field 42 along a direction intersecting a plane in which the reinforcing fibers 12 are aligned, thereby generating the magnetic field 42 along a direction intersecting a plane formed by the electroconductive loop that has been formed by the reinforcing fibers 12 and the equipotential materials 16 at the equipotential-material connecting step S12. The magnetic field coil 40 is arranged such that an end portion of the magnetic field coil 40 on the vertically upper side is separated from the surface of the composite material 10 on the one side by a predetermined distance. This predetermined distance is 1.5 centimeters, for example.

The coil included in the magnetic field coil 40 is preferably oriented in such a direction that the central axis of the coil extends along the vertical direction. In this case, the magnetic field coil 40 generates the magnetic field 42 along a direction intersecting the plane in which the reinforcing fibers 12 are aligned, thereby generating the magnetic field 42 along a direction orthogonal to the plane formed by the electroconductive loop that has been formed by the reinforcing fibers 12 and the equipotential materials 16 at the equipotential-material connecting step S12. The magnetic field coil 40 then applies the magnetic field 42 along the direction orthogonal to the plane formed by this electroconductive loop, thereby being able to efficiently induce an eddy current in the electroconductive loop, and thus can generate heat efficiently. Thus, the magnetic field coil 40 can efficiently heat the predetermined area 18 of the composite material 10.

The magnetic field coil 40 is electrically connected to the controller 50. The magnetic field coil 40 is controlled by the controller 50, whereby the magnitude and the frequency, for example, of the magnetic field 42 to be applied vertically upward to the composite material 10 can be changed. The magnetic field coil 40 preferably applies a magnetic field with a high frequency of 900 kHz or higher to the predetermined area 18 of the composite material 10.

The controller 50 is electrically connected to the pressure cylinder provided to the press head body 32. The controller 50 is electrically connected to the magnetic field coil 40. The controller 50 controls the pressure cylinder to control the press head 30, thereby being able to control the vertical position of the press head 30 relative to the composite material 10 and the pressure to be applied vertically downward to the composite material 10, for example. The controller 50 controls a current flowing in the magnetic field coil 40 to control the magnitude and the frequency of the magnetic field 42 applied by the magnetic field coil 40, thereby being able to control the heating temperature, the temperature rising rate, and the heating period for heating the composite material 10 in accordance with specific composition, for example, of the resin 14 of the composite material 10.

The controller 50 includes a storage unit and a processing unit. The storage unit includes a storage device such as a RAM, a ROM, and a flash memory, and stores therein a software program to be processed by the processing unit and data referred to by this software program, for example. The storage unit also functions as a storage area in which the processing unit temporarily stores a processing result, for example. The processing unit reads the software program, for example, from the storage unit to process it, thereby implementing functions corresponding to the contents of the software program, specifically, various functions that enable execution of the magnetic-field applying step S14 in the composite material forming method executed by the composite material forming apparatus 20.

The composite material forming apparatus 20 may be provided with a moving mechanism (not illustrated) configured to change the horizontal position of the press head 30 with respect to the composite material 10 and the horizontal position of the magnetic field coil 40 with respect to the composite material 10 in a synchronized manner. This moving mechanism is controlled by the controller 50, and can move the predetermined area 18, which is an area to be pressed by the press head 30 and is an area to which the magnetic field 42 is applied by the magnetic field coil 40, in the composite material 10 during forming processing by the composite material forming apparatus 20. The controller 50 can determine at any time to which area in the composite material 10 the predetermined area 18 has been moved.

After the equipotential-material connecting step S12, a step for performing the magnetic-field applying step S14 prior to the magnetic-field applying step S14 is performed on the composite material 10 before reaction on which the equipotential materials 16 are placed. Specifically, to begin with, a placement step of placing the composite material 10 before reaction on the vertically upper side of the flat stage 22 is performed.

Subsequently, a pressing step of pressing the composite material 10 before reaction placed on the flat stage 22 by the press head 30 is performed. Specifically, at this pressing step, to begin with, the controller 50 causes the press head 30 to move to a position vertically opposed to the other side of the composite material 10 before reaction on which the equipotential materials 16 are placed, thereby setting the press head 30 to face the predetermined area 18 of the composite material 10. At this pressing step, the controller 50 then causes the press head 30 to press the predetermined area 18 of the composite material 10 from the other side while being pressed against the other side of the predetermined area 18 of the composite material 10.

The magnetic-field applying step S14 is a step in which, as illustrated in FIG. 3, the composite material forming apparatus 20 causes the magnetic field coil 40 to apply the magnetic field 42 in a direction intersecting a plane formed by the electroconductive loop including the reinforcing fibers 12 that has been formed at the equipotential-material connecting step S12.

Specifically, at the magnetic-field applying step S14, to begin with, the controller 50 causes the magnetic field coil 40 to move toward the predetermined area 18 of the composite material 10 to a position vertically opposed to the one side of the predetermined area 18 of the composite material 10 that is placed on the flat stage 22 and is being pressed by the press head 30. At the magnetic-field applying step S14, the controller 50 then causes a current to flow in the magnetic field coil 40, thereby causing the magnetic field coil 40 to apply the magnetic field 42 from the one side of the composite material 10 to heat the predetermined area 18 of the composite material 10, and thus causes the resin 14 included in the composite material 10 to react.

At the magnetic-field applying step S14, the magnetic field 42 is generated along a direction intersecting the plane formed by the electroconductive loop including the reinforcing fibers 12 and the equipotential materials 16, which has been formed at the equipotential-material connecting step S12. Thus, at the magnetic-field applying step S14, to this electroconductive loop, the magnetic field 42 is applied along the direction orthogonal to the plane formed by this electroconductive loop, whereby an eddy current is efficiently induced, and thus heat can be efficiently generated. Thus, at the magnetic-field applying step S14, the predetermined area 18 of the composite material 10 can be efficiently heated.

In the present embodiment, at the magnetic-field applying step S14, the predetermined area 18 of the composite material 10 is subjected to magnetic field heating using the magnetic field coil 40 while being pressed by the press head 30. However, the present invention is not limited to this, and it may be subjected to the magnetic field heating while being pressed by using equipment different from the press head 30, or the composite material 10 that has been compressed in advance by compression processing may be subjected to the magnetic field heating without being pressed.

The equipotential-material removal step S16 is a step that is performed after the magnetic-field applying step S14 to remove the equipotential materials 16 that have been placed at the equipotential-material connecting step S12.

Figure 4:
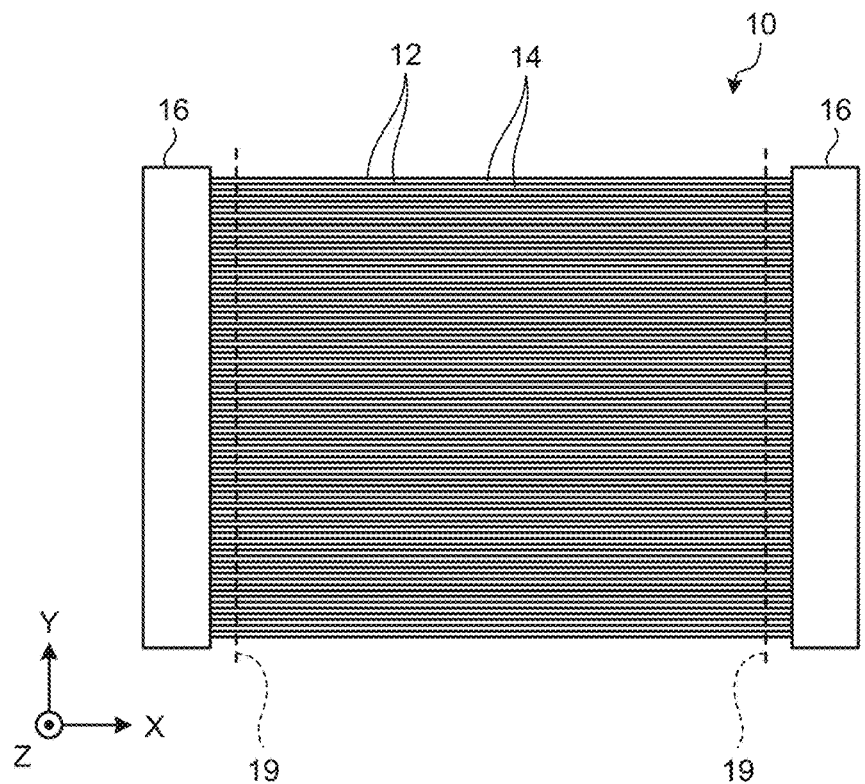
FIG. 4 is a top view illustrating a first example of an equipotential-material removal step of the composite material forming method given in FIG. 1.

FIG. 4 is a top view illustrating a first example of the equipotential-material removal step S16 of the composite material forming method given in FIG. 1. At the equipotential-material removal step S16, when electrically conductive coating materials are used as the equipotential materials 16 at the equipotential-material connecting step S12, areas of the composite material 10 at two locations where the equipotential materials 16 are connected are preferably cut to be removed by cutting along cutting-plane lines 19 extending along end portions of the equipotential materials 16 at two locations on the sides that are opposed to each other as illustrated in FIG. 4. In the present embodiment, at the equipotential-material removal step S16, a portion that is an end portion on one end side in the fiber direction and to which the equipotential material 16 on the +X side is connected and a portion that is an end portion on the other end side in the fiber direction and to which the equipotential material 16 on the −X side is connected are cut to be removed, whereby a portion in a central area in the fiber direction to which the equipotential material 16 are not connected can be taken out to be used as a formed product of the composite material 10.

Figure 5:
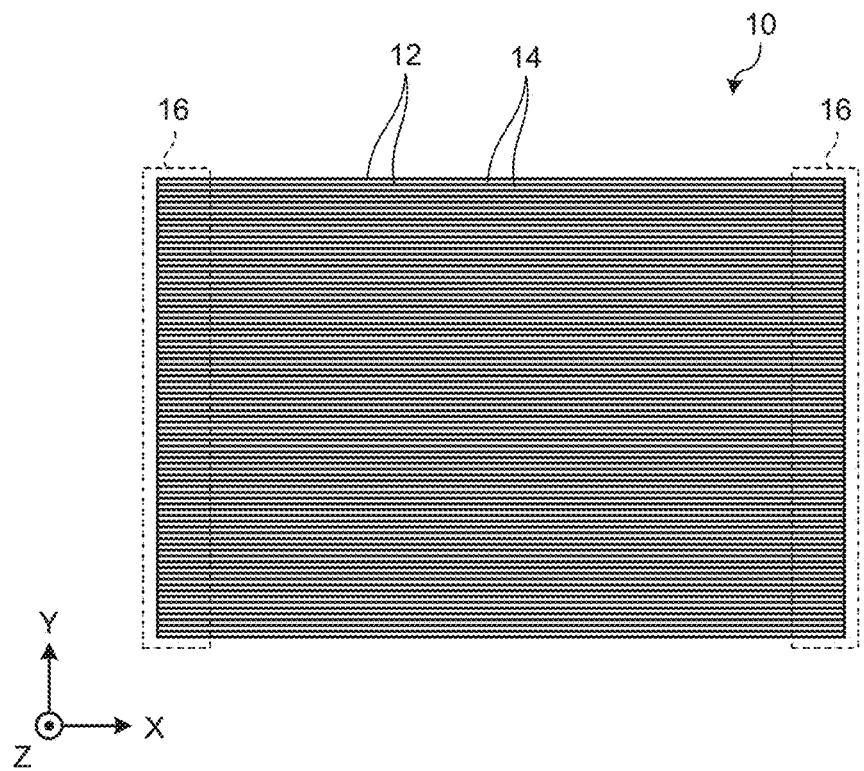
FIG. 5 is a top view illustrating a second example of the equipotential-material removal step of the composite material forming method given in FIG. 1.

FIG. 5 is a top view illustrating a second example of the equipotential-material removal step S16 of the composite material forming method given in FIG. 1. At the equipotential-material removal step S16, when electrically conductive jig materials are used as the equipotential materials 16 at the equipotential-material connecting step S12, the equipotential materials 16 placed at two locations are preferably detached to be withdrawn as illustrated in FIG. 5. At the equipotential-material removal step S16, the equipotential materials 16 are detached to be withdrawn, whereby the entire portion including both end sides to which the equipotential materials 16 had been connected can be used as a formed product of the composite material 10.

In the composite material forming method according to the first embodiment, with the configurations described above, because the electroconductive loop is formed with the reinforcing fibers 12 and the equipotential materials 16 arranged on the end portions of the composite material 10, a sufficient eddy current can be induced in an area of the composite material 10 between the equipotential materials 16, that is, across the entire composite material 10 when the magnetic field 42 is applied, whereby the occurrence of temperature unevenness in the composite material 10 can be reduced. Thus, in the composite material forming method according to the first embodiment, the occurrence of strength unevenness in the composite material 10 obtained by causing the resin 14 to react can be reduced, whereby the composite material 10 with high quality can be obtained.

In the composite material forming method according to the first embodiment, at the equipotential-material connecting step S12, end portions of two reinforcing fibers 12 on the one end side are connected to each other and end portions thereof on the other end side are connected to each other by the equipotential materials 16 at two locations. Thus, in the composite material forming method according to the first embodiment, the electroconductive loop including the two reinforcing fibers 12 is formed, and thus a sufficient eddy current can be induced in an area between the two reinforcing fibers 12. Thus, in the composite material forming method according to the first embodiment, a sufficient eddy current can be induced in any area of the composite material 10 in which the reinforcing fibers 12 are arranged, whereby the occurrence of temperature unevenness in the composite material 10 during heating can be further reduced.

In the composite material forming method according to the first embodiment, at the equipotential-material connecting step S12, a contact resistance formed between each equipotential material 16 and the corresponding reinforcing fiber 12 is 100Ω or lower. Thus, in the composite material forming method according to the first embodiment, a current can easily flow in the electroconductive loop including the reinforcing fibers 12. Thus, in the composite material forming method according to the first embodiment, the heating efficiency can be improved by causing the electroconductive loop including more reinforcing fibers 12 to contribute to heating of the composite material 10.

The composite material forming method according to the first embodiment further includes, after the magnetic-field applying step S14, the equipotential-material removal step S16 of removing the equipotential materials 16. Thus, in the composite material forming method according to the first embodiment, the composite material 10 in which the occurrence of strength unevenness is reduced can be used without being influenced by the equipotential materials 16.

In the composite material forming method according to the first embodiment, at the equipotential-material connecting step S12, electrically conductive jig materials are used as the equipotential materials 16 and the electrically conductive jig materials are placed on the composite material 10 to form the electroconductive loop, and at the equipotential-material removal step S16, the electrically conductive jig materials as the equipotential materials 16 can be withdrawn from the composite material 10. In this case, in the composite material forming method according to the first embodiment, as each electrically conductive jig material, a material including at least one of electrically conductive material foil, an electrically conductive material plate, an electrically conductive material needle, and an electrically conductive material comb member can be used. Thus, in the composite material forming method according to the first embodiment, even areas of the composite material 10 in which the equipotential materials 16 are placed to form the electroconductive loop including the reinforcing fibers 12 can be used with the influence of the equipotential materials 16 being reduced.

In the composite material forming method according to the first embodiment, at the equipotential-material connecting step S12, electrically conductive coating materials are used as the equipotential materials 16 and the electrically conductive coating materials are applied to the composite material 10 to form the electroconductive loop, and at the equipotential-material removal step S16, areas of the composite material 10 to which the electrically conductive coating materials are applied can be cut to be removed. In this case, in the composite material forming method according to the first embodiment, as each electrically conductive coating material, a material including at least one of an electrically conductive material paste, an electrically conductive material ink, and an electrically conductive material plating solution can be used. Thus, in the composite material forming method according to the first embodiment, the contact resistance that can be formed when the electroconductive loop including the reinforcing fibers 12 is formed can be reduced to a minimum, and thus the heating efficiency can be improved by causing the electroconductive loop including more reinforcing fibers 12 to contribute to heating of the composite material 10.

Second Embodiment

Figure 6:
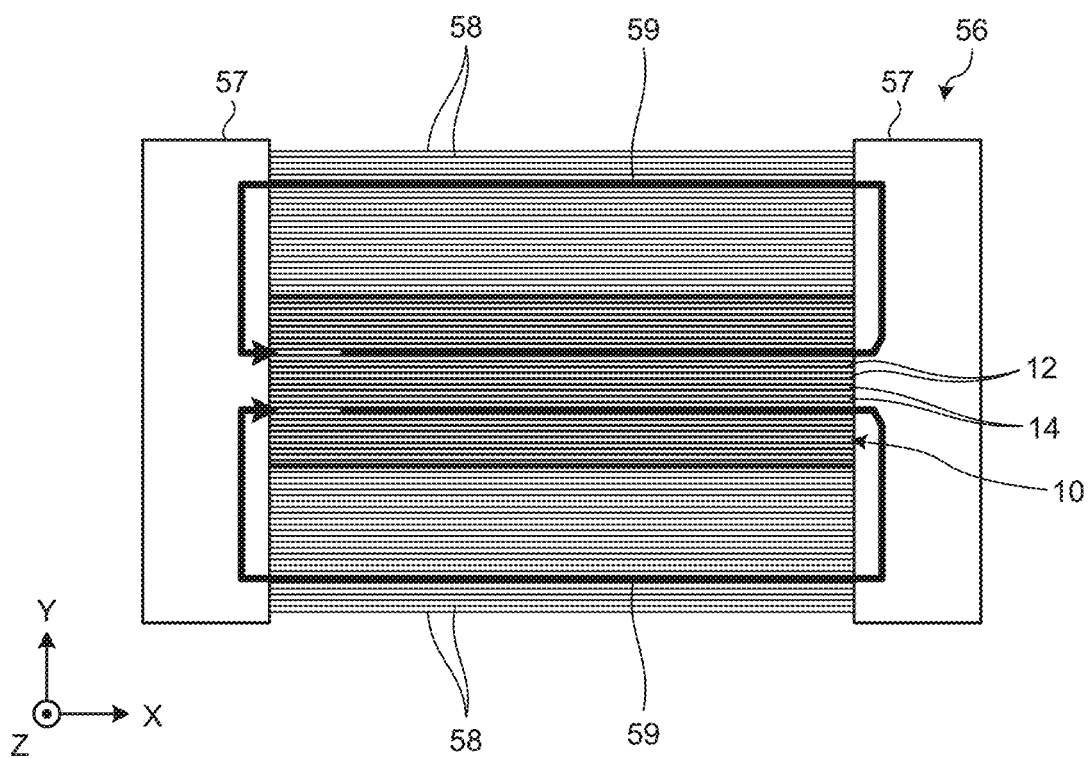
FIG. 6 is a top view illustrating an equipotential-material connecting step of a composite material forming method according to a second embodiment of the present invention.

FIG. 6 is a top view illustrating an equipotential-material connecting step S12 of a composite material forming method according to a second embodiment of the present invention. In the composite material forming method according to the second embodiment is a method in which the equipotential materials 16 to be placed on the composite material 10 before reaction of the resin 14 at the equipotential-material connecting step S12 in the composite material forming method according to the first embodiment is changed to an equipotential material 56. The composite material forming method according to the second embodiment is the same in the other configurations as the composite material forming method according to the first embodiment. In the description of the composite material forming method according to the second embodiment, for elements similar to those in the composite material forming method according to the first embodiment, the same reference signs as those in the first embodiment are used, and detailed description thereof is omitted.

The equipotential material 56 to be used at the equipotential-material connecting step S12 of the composite material forming method according to the second embodiment includes a pair of both-end members 57 and a pair of both-ends connecting members 58 as illustrated in FIG. 6. The pair of both-end members 57 and the pair of both-ends connecting members 58 are each formed of an electrically conductive material similar to that of the equipotential materials 16. For both of the pair of both-end members 57 and the pair of both-ends connecting members 58, electrically conductive jig materials are used in the present embodiment. However, the present invention is not limited to this, and an electrically conductive coating material may be used for some or all of them.

The pair of both-end members 57 are portions to be arranged, when being placed at the equipotential-material connecting step S12, such that one of the pair connects end portions of the reinforcing fibers 12 on one end side to each other and the other of the pair connects end portions of the reinforcing fibers 12 on the other end side to each other along the width direction of the composite material 10, and are formed such that the length thereof in the width direction is greater than the length of the composite material 10 in the width direction.

The pair of both-ends connecting members 58 are portions each to be arranged along the fiber direction of the composite material 10 each on both outer sides of the composite material 10 in the width direction when being placed at the equipotential-material connecting step S12, and are formed in parallel to each other. One end of each thereof is electrically connected to one of the pair of both-end members 57, and the other end thereof is electrically connected to the other of the pair of both-end members 57.

The equipotential-material connecting step S12 of the composite material forming method according to the second embodiment of the present invention is a step of connecting an end portion of one of the reinforcing fibers 12 on one end side and an end portion of this one reinforcing fiber 12 on the other end side with the equipotential material 56 as illustrated in FIG. 6. At the equipotential-material connecting step S12 according to the second embodiment, specifically, the pair of both-end members 57 of the equipotential material 56 are placed on the composite material 10 such that one of the pair connects end portions of the reinforcing fibers 12 on the one end side to each other and the other of the pair connects end portions of the reinforcing fibers 12 on the other end side to each other. At the equipotential-material connecting step S12 according to the second embodiment, following this placement, the pair of both-ends connecting members 58 are placed along a direction substantially parallel to the reinforcing fibers 12 each on both outer sides of the composite material 10 in the width direction.

As described above, at the equipotential-material connecting step S12 according to the second embodiment, an electroconductive loop 59 illustrated in FIG. 6 including: only any one reinforcing fiber 12 located closer to one side of the composite material 10 in the width direction; the pair of both-end members 57; and one of the pair of both-ends connecting members 58 is formed so as to connect an inner portion of the composite material 10 and one of outer sides of the composite material 10 in the width direction. Furthermore, an electroconductive loop 59 illustrated in FIG. 6 including: only any one reinforcing fiber 12 located closer to the other side of the composite material 10 in the width direction; the pair of both-end members 57; and the other of the pair of both-ends connecting member 58 is formed so as to connect an inner portion of the composite material 10 and the other of the outer sides of the composite material 10 in the width direction. In other words, at the equipotential-material connecting step S12 according to the second embodiment, the area between the two predetermined reinforcing fibers 12 can be arranged inside an area in which a sufficient eddy current is induced, and thus the area in which the composite material 10 is placed can be arranged inside the area in which a sufficient eddy current is induced. Herein, in the area inside the area in which a sufficient eddy current is induced, the heating efficiency is satisfactory.

At the equipotential-material connecting step S12 according to the second embodiment, the electroconductive loops 59 illustrated in FIG. 6 are formed as described above. Thus, at a magnetic-field applying step S14 according to the second embodiment to be performed subsequently, by generating a magnetic field 42 along a direction intersecting a plane formed by these electroconductive loops 59, an eddy current can be efficiently induced, whereby heat can be efficiently generated and the composite material 10 can be efficiently heated.

The composite material forming method according to the second embodiment has configurations as described above, and thus provides effects similar to those of the composite material forming method according to the first embodiment except for the effect provided by connecting end portions of two reinforcing fibers 12 on one end side to each other and connecting end portions thereof on the other end side to each other with the equipotential materials 16 at two locations.

In the composite material forming method according to the second embodiment, at the equipotential-material connecting step S12, an end portion of one of the reinforcing fibers 12 on one end side and an end portion of this one reinforcing fiber 12 on the other end side are connected by the equipotential material 56. Thus, in the composite material forming method according to the second embodiment, the electroconductive loop 59 including only this one reinforcing fiber 12 is formed, and thus an area between two predetermined reinforcing fibers 12 can be arranged inside an area in which a sufficient eddy current is induced. Herein, in the area inside the area in which a sufficient eddy current is induced, the heating efficiency is satisfactory. Thus, in the composite material forming method according to the second embodiment, any area in the composite material 10 in which the reinforcing fibers 12 are arranged can be an area in which heating is satisfactory, and thus the occurrence of temperature unevenness in the composite material 10 during heating can be further reduced.

Third Embodiment

A composite material forming method according to a third embodiment is a method in which a commingled material that is a blend of the reinforcing fibers 12 and a thermoplastic resin fiber as the resin 14 is selected as a composite material 10 to be formed in contrast to each of the first embodiment and the second embodiment. The commingled material includes a commingled knitted material in which reinforcing fibers 12 and thermoplastic resin fibers are woven in a knitted shape. The composite material forming method according to the third embodiment and the commingled material as the composite material 10 to be formed by this method have configurations as described above, and thus provide effects similar to those of each of the first embodiment and the second embodiment.

REFERENCE SIGNS LIST 10 composite material
12 reinforcing fiber
14 resin
16, 56 equipotential material
18 predetermined area
19 cutting-plane line
20 composite material forming apparatus
22 flat stage
30 press head
32 press head body
40 magnetic field coil
42 magnetic field
50 controller
57 both-end member
58 both-ends connecting member
59 electroconductive loop

The invention claimed is:
1. A method for forming a composite material including reinforcing fibers, the method comprising:
connecting end portions of the reinforcing fibers with equipotential materials to form an electroconductive loop including the reinforcing fibers in the composite material before reaction;
applying a magnetic field in a direction intersecting a plane formed by the electroconductive loop; and removing the equipotential materials after applying the magnetic field, wherein connecting the end portions includes placing electrically conductive jig materials serving as the equipotential materials on the composite material to form the electroconductive loop, and removing the equipotential materials includes withdrawing the electrically conductive jig materials as the equipotential materials from the composite material.

2. The method according to claim 1, wherein the electrically conductive jig materials include at least one of an electrically conductive material foil, an electrically conductive material plate, an electrically conductive material needle, or an electrically conductive material comb member.

3. A method for forming a composite material including reinforcing fibers, the method comprising:

connecting end portions of reinforcing fibers with equipotential materials to form an electroconductive loop including the reinforcing fibers in the composite material before reaction;

applying a magnetic field in a direction intersecting a plane formed by the electroconductive loop; and removing the equipotential materials after applying the magnetic field, wherein connecting the end portions includes applying an electrically conductive coating material serving as the equipotential materials to the composite material to form the electroconductive loop, and removing the equipotential materials includes cutting areas of the composite material to which the electrically conductive coating material was applied.

4. The method according to claim 3, wherein the electrically conductive coating material includes at least one of an electrically conductive material paste, an electrically conductive material ink, or an electrically conductive material plating solution.

5. The method according to claim 1, wherein connecting the end portions includes, by the equipotential materials, connecting end portions of two of the reinforcing fibers on a first end side to each other and connecting end portions of the two reinforcing fibers on a second end side to each other.

6. The method according to claim 1, wherein
connecting the end portions includes, by the equipotential materials, connecting an end portion of one of the reinforcing fibers on a first end side and an end portion of one of the reinforcing fibers on a second end side.

7. The method according to claim 1, wherein at connecting the end portions, a contact resistance between the equipotential materials and the reinforcing fiber is 100Ω or lower.

8. The method according to claim 3, wherein connecting the end portions includes, by the equipotential materials, connecting end portions of two of the reinforcing fibers on a first end side to each other and connecting end portions of the two reinforcing fibers on a second end side to each other.

9. The method according to claim 3, wherein
connecting the end portions includes, by the equipotential materials, connecting an end portion of one of the reinforcing fibers on a first end side and an end portion of one of the reinforcing fibers on a second end side.

10. The method according to claim 3, wherein at connecting the end portions, a contact resistance between the equipotential materials and the reinforcing fiber is 100Ω or lower.

* * * * *